(12) United States Patent
Wong

(10) Patent No.: US 6,597,704 B1
(45) Date of Patent: Jul. 22, 2003

(54) SYSTEM FOR TRANSLATING A MESSAGE FROM A FIRST TRANSMISSION PROTOCOL TO A SECOND TRANSMISSION PROTOCOL

(75) Inventor: Ellis L. Wong, Billerica, MA (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/167,792

(22) Filed: Oct. 7, 1998

(51) Int. Cl.$^7$ .............................. H04J 3/16; H04J 3/24
(52) U.S. Cl. ........................................ 370/466; 370/474
(58) Field of Search ................................ 370/466, 467, 370/401, 472, 470, 474, 469, 473, 351–3, 471; 709/230, 246, 249

(56) References Cited

U.S. PATENT DOCUMENTS

| | | | | |
|---|---|---|---|---|
| 5,021,949 A | * | 6/1991 | Morten et al. ............... 709/231 |
| 5,023,873 A | | 6/1991 | Stevenson et al. ........... 371/8.2 |
| 5,182,748 A | | 1/1993 | Sakata et al. |
| 5,636,212 A | | 6/1997 | Ikeda .......................... 370/233 |
| 5,652,908 A | | 7/1997 | Douglas et al. ............. 395/800 |
| 5,793,771 A | * | 8/1998 | Darland et al. ............. 370/467 |
| 5,802,258 A | | 9/1998 | Chen ..................... 395/182.08 |
| 5,838,989 A | | 11/1998 | Hutchison et al. .......... 395/831 |
| 5,856,981 A | | 1/1999 | Voelker ...................... 371/20.1 |
| 5,918,017 A | | 6/1999 | Attanasio et al. ...... 395/200.54 |
| 5,918,022 A | * | 6/1999 | Batz et al. ............. 395/200.66 |
| 5,933,422 A | | 8/1999 | Kusano et al. .............. 370/331 |
| 5,943,481 A | | 8/1999 | Wakeland ............... 395/200.6 |
| 6,044,407 A | | 3/2000 | Jones et al. ................. 709/246 |
| 6,055,224 A | * | 4/2000 | King .......................... 370/217 |
| 6,098,116 A | | 8/2000 | Nixon et al. ................... 710/8 |
| 6,131,125 A | | 10/2000 | Rostoker et al. ............ 709/250 |
| 6,134,640 A | * | 10/2000 | Unno et al. ................. 711/171 |
| 6,151,300 A | * | 11/2000 | Hunt et al. .................. 370/231 |
| 6,192,409 B1 | | 2/2001 | Kim ........................... 709/230 |
| 6,226,676 B1 | * | 5/2001 | Crump et al. ............... 709/227 |
| 6,311,222 B1 | * | 10/2001 | Crump et al. ............... 709/246 |
| 6,317,307 B1 | * | 11/2001 | Bone et al. .................. 361/124 |
| 6,320,874 B1 | * | 11/2001 | Crump et al. ............... 370/466 |
| 6,484,206 B2 | * | 11/2002 | Crump et al. ............... 709/227 |

OTHER PUBLICATIONS

Stevens, TCP/IP vol 1, pp 34–36, 223–227, 148, 149 1994 Addison Wesley Longman, Inc.*
Stevens, W. Richard, "TCP Connection Establishment and Termination," TCP/IP Illustrated, vol. 1, Addison–Wesley, Reading Massachusetts, Dec., 1994, pp. 229–234.

* cited by examiner

Primary Examiner—David Vincent
(74) Attorney, Agent, or Firm—Withrow & Terranova, PLLC (57) ABSTRACT

An apparatus for translating a message (having message data) from a first transmission protocol to a second transmission protocol appends a length datum field to message data within a second protocol envelope that is used to transport the message in accord with the second transmission protocol. To that end, the apparatus first receives the message data from the first protocol, and then calculates the length of the received message data within the envelope. A length datum then is appended to the message data to produce a revised message. The length datum indicates the calculated length of the message data. Once produced, the revised message is directed to the second protocol for transmission in the second protocol.

6 Claims, 8 Drawing Sheets

SYSTEM FOR TRANSLATING A MESSAGE FROM A FIRST TRANSMISSION PROTOCOL TO A SECOND TRANSMISSION PROTOCOL

CROSS REFERENCE TO RELATED APPLICATIONS

U.S. patent application Ser. No. 09/167,916 now U.S. Pat. No. 6,226,676 entitled CONNECTION ESTABLISHMENT AND TERMINATION IN A MIXED PROTOCOL NETWORK, filed on even date herewith incorporated by reference in its entirety;

U.S. patent application Ser. No. 09/167,839 now U.S. Pat. No. 6,320,874 entitled ESTABLISHING AND TERMINATING CONNECTIONS IN A MIXED PROTOCOL NETWORK, filed on even date herewith and incorporated by reference in its entirety;

U.S. patent application Ser. No. 09/167,950 entitled ERROR RECOVERY IN A MIXED PROTOCOL NETWORK, filed on even date herewith and incorporated by reference in its entirety;

U.S. patent application Ser. No. 09/167,746 now U.S. Pat. No. 6,484,206 entitled EFFICIENT RECOVERY OF MULTIPLE CONNECTIONS IN A COMMUNICATION NETWORK, filed on even date herewith and incorporated by reference in its entirety; and U.S patent application Ser. No. 09/167,811 now U.S. Pat. No. 6,311,222 entitled TRANSLATOR MEMORY MANAGEMENT SYSTEM, filed on even date herewith and incorporated by reference in its entirety.

FIELD OF THE INVENTION

The invention generally relates networks and, more particularly, the invention relates to translating a message from a first transmission protocol to a second transmission protocol.

BACKGROUND OF THE INVENTION

In today's information age, data communication networks are becoming more pervasive as an ever-increasing number of communication consumers require access to on-line computer resources. To that end, many data communication networks are evolving to meet the needs of these communication consumers. As these data communication networks evolve, it often becomes necessary to combine or integrate network segments that support different communication/transmission protocols.

One well-known communication protocol in widespread use is the X.25 protocol (i.e., a packet based protocol). The X.25 protocol defines the physical, link, and network layer protocols (layers one, two, and three) of the International Standards Organization ("ISO") seven-layer protocol model. In a communication network that utilizes the X.25 protocol (referred to herein as an "X.25 network"), two devices (referred to herein as an "X.25 device" or "X.25 devices") exchange X.25 data packets over a virtual circuit that is established across the X.25 network. One type of virtual circuit commonly used in the X.25 network is a permanent virtual circuit ("PVC"). A PVC is a virtual circuit that is set up automatically within the X.25 network and remains active as long as the X.25 network is operative. Unlike a PVC, a switched virtual circuit ("SVC") is set up only when explicitly requested by an X.25 device. Typical X.25 networks support both permanent and switched multiple virtual circuits. As is known in the art, a data message typically is encapsulated within an X.25 transmission envelope for transmission via the PVC or SVC.

Another well-known communication protocol in widespread use is the Transmission Control Protocol ("TCP", a stream based protocol). TCP is a connection-oriented transport layer protocol that is generally used in conjunction with a connectionless network layer protocol known as the Internet Protocol ("IP"). In a communication network that utilizes the TCP protocol (referred to herein as a "TCP/IP network"), two devices (referred to herein as a "TCP device" or "TCP devices") exchange TCP data segments over a TCP connection that is established across the TCP/IP network. In order to set up the TCP connection within the TCP/IP network, one TCP device transmits a specially formatted message (referred to herein as a "TCP SYN message") that includes, among other things, an IP address identifying the destination TCP device and a TCP port number identifying one of a number of applications supported by the destination TCP device. The combination of IP address and TCP port number is referred to herein as a "socket." Because the TCP connection is set up only when explicitly requested by a TCP device, the TCP connection is considered to be a switched connection and thus, is not considered to be a permanent connection. As is known in the art, a message is transmitted via the TCP protocol by means of a TCP segment.

Because both the X.25 protocol and the TCP protocol are in widespread use, it has become desirable for X.25 devices to communicate with TCP devices in certain data communication networks. Undesirably, the X.25 protocol is sufficiently different from the TCP protocol that X.25 devices cannot inherently communicate with TCP devices.

SUMMARY OF THE INVENTION

In accordance with one aspect of the invention, an apparatus for translating a message (having message data) from a first transmission protocol to a second transmission protocol appends a length datum field to message data within a second protocol envelope that is used to transport the message in accord with the second transmission protocol. To that end, the apparatus first receives the message data from the first protocol, and then calculates the length of the received message data within the envelope. A length datum then is appended to the message data to produce a revised message. The length datum indicates the calculated length of the message data. Once produced, the revised message is directed to the second protocol for transmission in the second protocol.

In some embodiments, the first protocol is utilized by a first protocol interface that interfaces the apparatus with a first protocol network. In a similar manner, in some embodiments, the second protocol is utilized by a second protocol interface that interfaces the apparatus with a second protocol network. In preferred embodiments, the first network protocol is a stream based protocol (e.g., TCP) while the second network protocol is a packet based protocol (e.g., X.25). In other embodiments, the first network protocol is packet based while the second network protocol is stream based.

In other embodiments, the apparatus determines if more message data is to be received in the first protocol. A more datum then is appended to the received message data if more message data is to be received in the first protocol. The more datum indicates that more message data is to be received in the first protocol.

In accordance with another aspect of the invention, an apparatus for translating from a first network protocol to a second network protocol receives a message in the first protocol. The message has message data and an appended length datum indicating the length of the message data. The length datum preferably is appended directly to the message data. The length datum then is utilized to form the message data. The formed message then is directed to the second protocol for transmission in the second protocol.

In yet other embodiments, the received message also includes a more datum field indicating if additional message data is to be received in the first protocol to complete the message. When such a message is received, the more field is set in the second protocol if the more datum is set to indicate that additional message data is to be received in the first protocol to complete the message.

BRIEF DESCRIPTION OF THE DRAWINGS

The foregoing and other objects and advantages of the invention will be appreciated more fully from the following further description thereof with reference to the accompanying drawings wherein.

DESCRIPTION OF PREFERRED EMBODIMENTS

Figure 1:
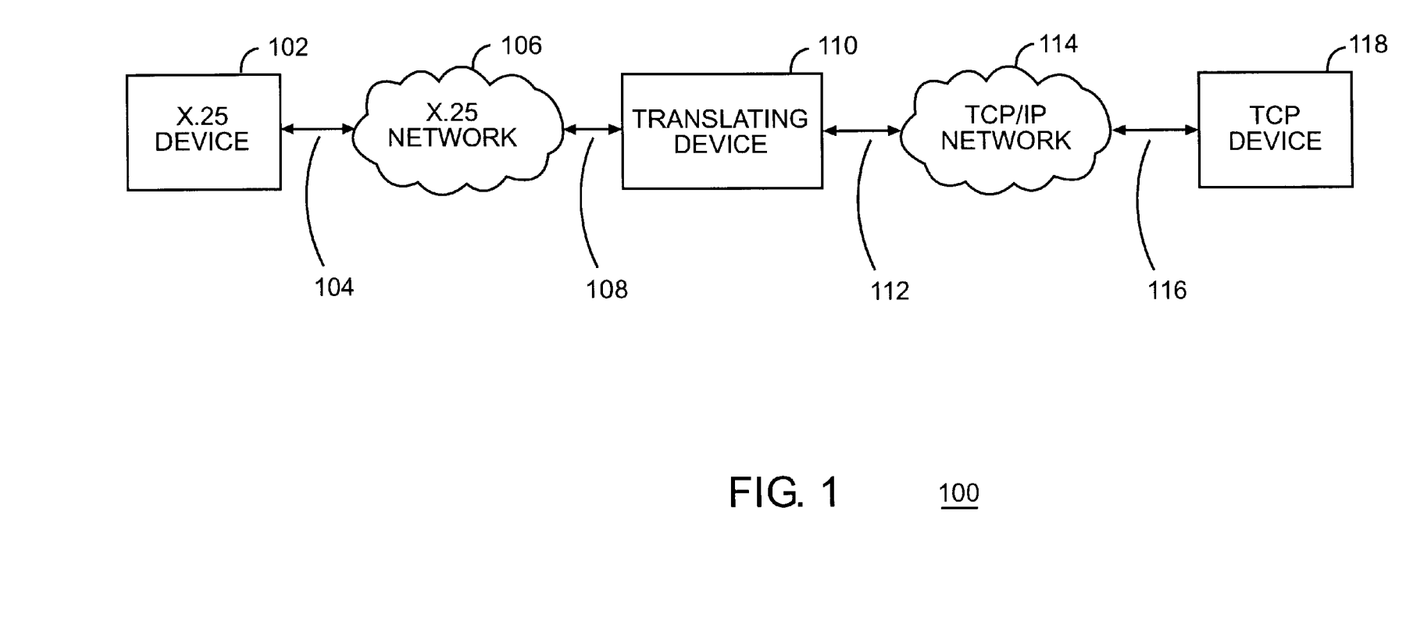
FIG. 1 schematically shows an exemplary data communication network in which an X.25 device communicates with a TCP device through a translating device.

FIG. 1 schematically shows an exemplary data communication network 100 in which an X.25 device 102 communicates with a TCP device 118 through a translating device 110 (a/k/a translator 110). More specifically, the X.25 device 102 is coupled to an X.25 network 106 by way of a first X.25 link 104. The translating device 110 also is coupled to the X.25 network 106 by way of a second X.25 link 108. In preferred embodiments, the X.25 device 102 communicates with the translating device 110 over the X.25 network 106 using the X.25 protocol over a dedicated PVC that is established between the X.25 device 102 and the translating device 110. When communicating with the X.25 device 102 over the dedicated PVC, the translating device 110 acts, and appears to the X.25 device 102, as another X.25 device.

In a similar manner, the TCP device 118 is coupled to a TCP/IP network 114 by way of a first TCP/IP link 116. The translating device 110 also is coupled to the TCP/IP network 114 by way of a second TCP/IP link 112. In preferred embodiments, the TCP device 118 communicates with the translating device 110 over the TCP/IP network 114 using the TCP protocol over a TCP connection that is established between the TCP device 118 and the translating device 110. When communicating with the TCP device 118 over the TCP connection, the translating device 110 acts, and appears to the TCP device 118, as another TCP device.

Figure 2:
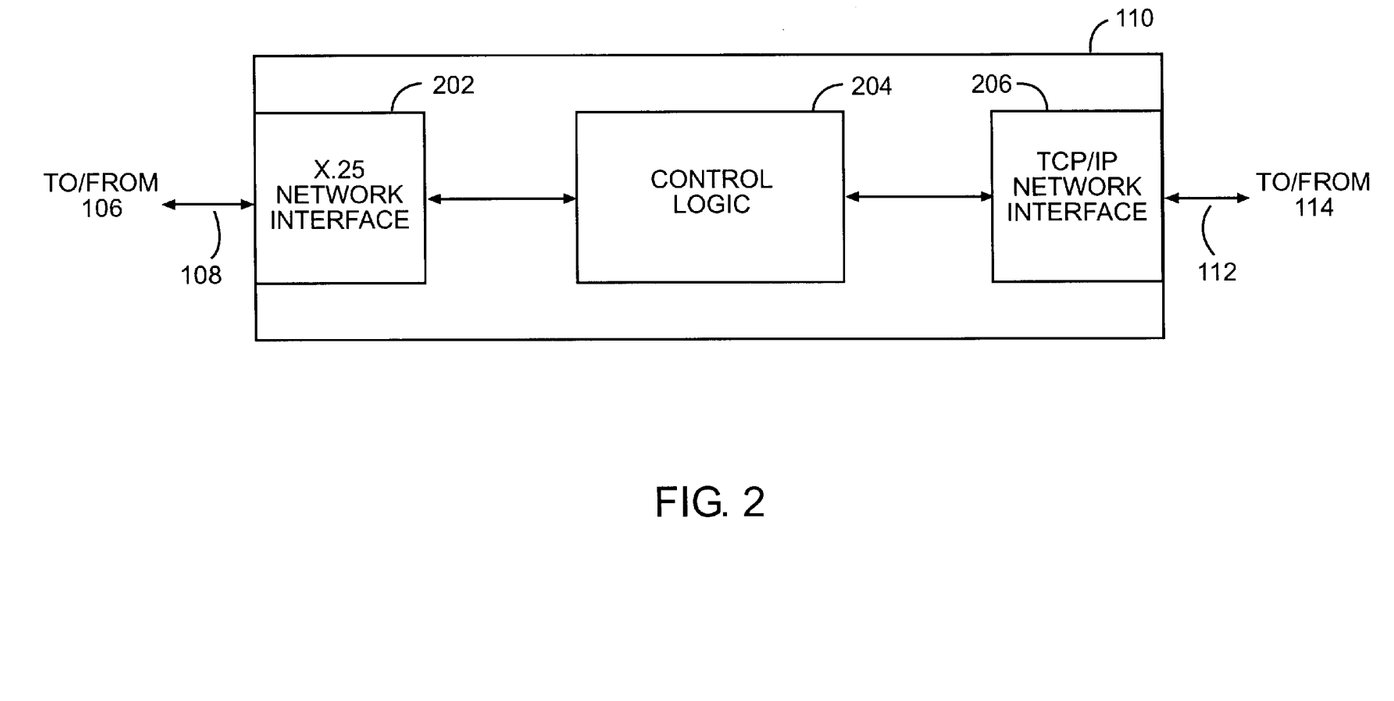
FIG. 2 schematically shows an exemplary translating device that is configured in accordance with a preferred embodiment of the present invention.

FIG. 2 schematically shows an exemplary translating device 110 that is configured in accordance with a preferred embodiment of the present invention. Among other things, the translating device 110 includes an X.25 network interface 202 for interfacing with the X.25 network 106, a TCP/IP network interface 206 for interfacing with the TCP/IP network 114, and control logic 204 for translating from one of the network protocols to the other of the two network protocols. Each element of the translating device 110 is discussed in greater detail below.

The X.25 network interface 202, which is coupled to the X.25 link 108, includes logic enabling the translating device 110 to communicate over the X.25 network 106. To that end, the X.25 network interface 202 includes both logic for receiving X.25 messages from the X.25 link 108, and logic for transmitting X.25 messages generated within the translating device 110 onto the X.25 link 108.

The TCP/IP network interface 206, which is coupled to the TCP link 112, preferably includes logic for enabling the translating device 110 to communicate over the TCP/IP network 114. To that end, the TCP/IP network interface 206 includes both logic for receiving TCP segments from the TCP link 112, and logic for transmitting TCP segments generated within the translating device 110 onto the TCP link 112.

The control logic 204 performs a number of different functions (some of which are described in detail below) to allow any X.25 device, such as the X.25 device 102, to communicate with any TCP device, such as the TCP device 118. The control logic 204 is operably coupled to both the X.25 network interface 202 for receiving and transmitting X.25 messages, and to the TCP/EP network interface 206 for receiving and transmitting TCP segments.

In order for the X.25 device 102 to communicate with the TCP device 118 within the data communication network 100, it is necessary for an end-to-end connection to be established between the X.25 device 102 and the TCP device 118. Such connection may be established by many methods, such as that disclosed in copending U.S. patent application entitled, "CONNECTION ESTABLISHMENT AND TERMINATION IN A MIXED PROTOCOL NETWORK", having attorney docket number 2204/108, filed on even date herewith and naming Richard Crump, Mark Leary, and Ellis Wong as inventors. For example, either one of the X.25 device 102 or the TCP device 118 may initiate the connection.

Figure 3A:
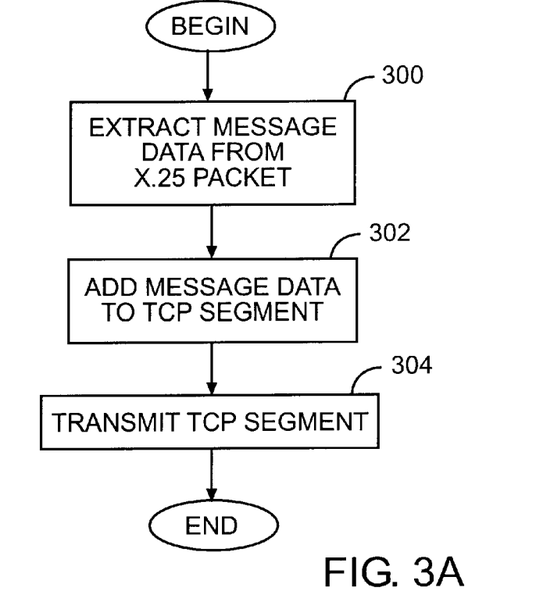
FIG. 3A shows a preferred process utilized by the translating device shown in FIG. 2 for translating a message from the X.25 protocol to the TCP protocol.
Figure 3B:
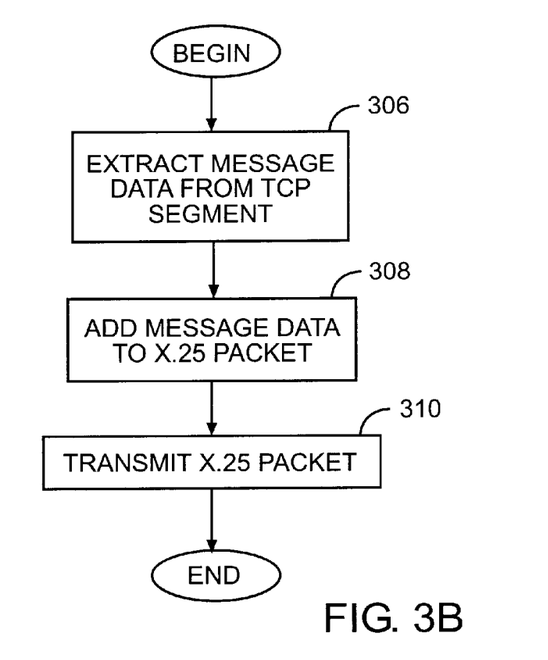
FIG. 3B shows a preferred process utilized by the translating device shown in FIG. 2 for translating a message from the TCP protocol to the X.25 protocol.

FIGS. 3A and 3B each show the steps of a first embodiment of the invention in which messages are transmitted between the X.25 device 102 and the TCP device 118 via the translator 110. In this embodiment, however, the message to be transmitted between the two devices 102 and 118 cannot be larger than the size of either a single X.25 packet or a single TCP segment. Moreover, this embodiment is not applicable to those cases in which TCP segmentation occurs. It should be noted that the term "envelope" is generally utilized herein to describe either a TCP segment, an X.25 packet, or other similar apparatus utilized by any transport protocol.

FIG. 3A shows a preferred process utilized by the translating device 110 for translating the message from the X.25 protocol to the TCP protocol. The process begins at step 300 in which the message data is extracted from a received X.25 packet. The process continues to step 302 in which the extracted data is added to a TCP segment. Once the message is added, the TCP segment is transmitted to the TCP device 118 (step 304).

The process shown in FIG. 3B shows a preferred process utilized by the translating device 110 for translating the message from the TCP protocol to the X.25 protocol. The process begins at step 306 in which the message data is extracted from a received TCP segment. The process continues to step 308 in which the extracted data is added to an X.25 packet. Once the message is added, the X.25 packet is transmitted to the X.25 device 102 (step 310).

Figure 4A:
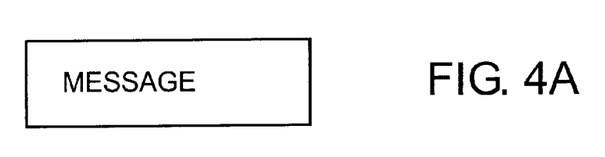
FIG. 4A shows an exemplary message without a header prior to being added to a data envelope.
Figure 4B:
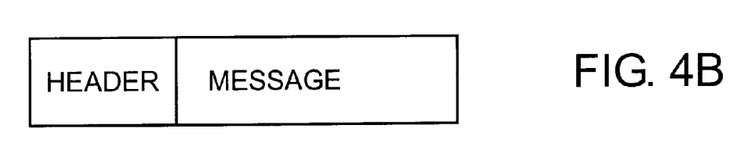
FIG. 4B shows the message shown in FIG. 4A having an appended header in accord with preferred embodiments of the invention.
Figure 4C:
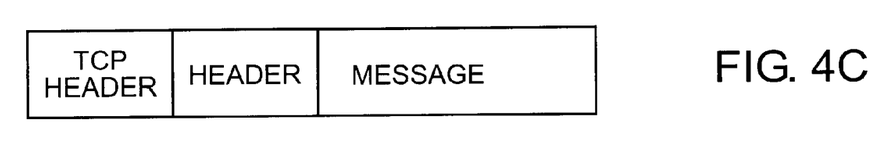
FIG. 4C shows the message and header combination of FIG. 4B within a TCP segment.

In other embodiments of the invention, a header is appended to the message data within the protocol data envelope (i.e., the TCP segment) transporting the data message. Unlike the embodiment shown in FIGS. 3A and 3B, use of the header enables transmission between the two disparate protocol types without requiring similarity in X.25 packet, TCP segment, and message size. The header may include a number of different data variables, some of which are discussed below. FIG. 4A shows an exemplary message without a header prior to being added to a data envelope. FIG. 4B shows the message having an appended header (the combination of which is referred to herein as the "message and header combination"). FIG. 4C shows the message and header combination of FIG. 4B within a TCP segment (i.e., a data envelope). As is known in the art, the TCP segment includes a TCP header.

Figure 5A:
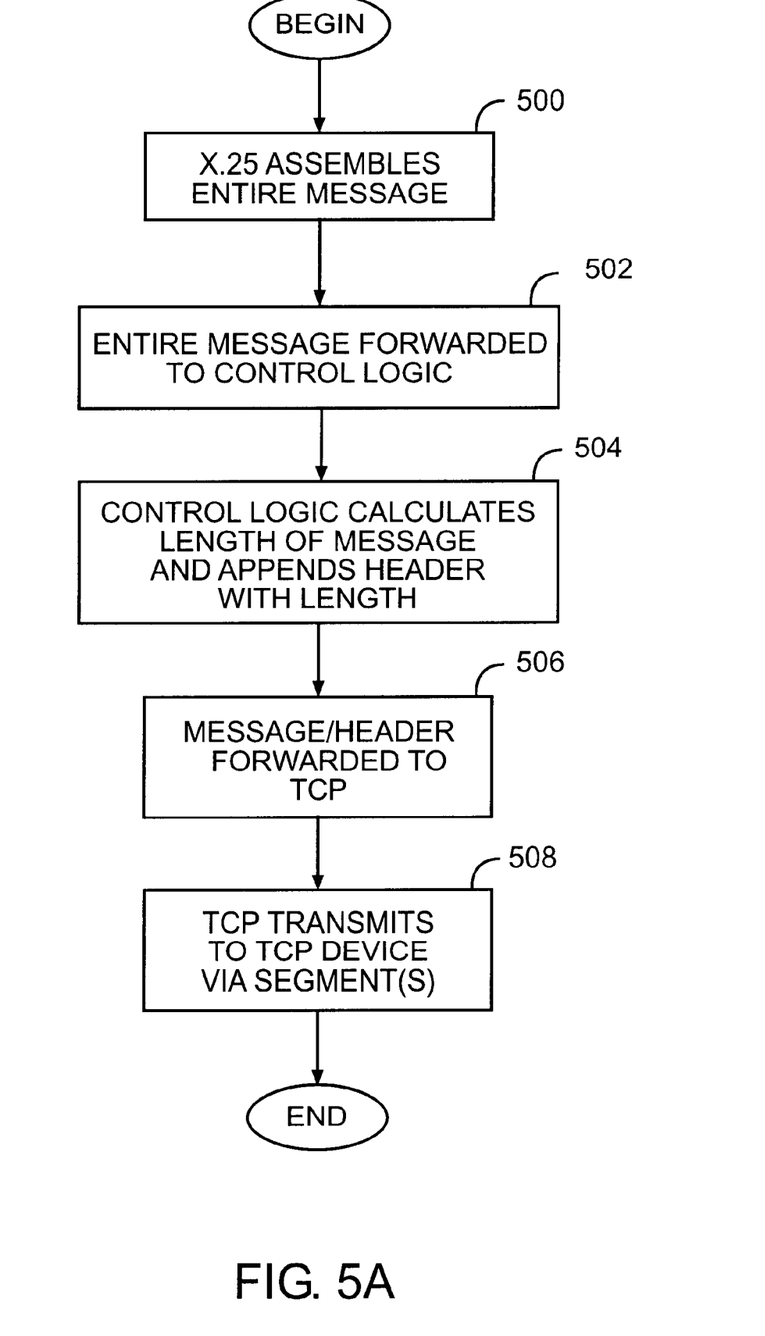
FIGS. 5A and 5B show a preferred process for transmitting messages between a TCP device and an X.25 device.

FIG. 5A shows a preferred process of transmitting a message from the X.25 device to the TCP device. The process begins at step 500 in which the X.25 interface 202 assembles the entire message from a stream of X.25 data packets ("packets") received from the X.25 device. To that end, the X.25 receives a series of packets and assembles the message based upon the value of the "more" field that is conventionally located within a header of such packets. The process then continues to step 502 in which the entire assembled message is forwarded to the control logic 204. The control logic 204 responsively calculates the length of the assembled message and appends a header directly to the message indicating the length of the message (step 504). The message/header combination then is forwarded to the TCP interface 206 for transmission to the TCP device (step 506). The TCP interface 206 then transmits the message/header to the TCP device via one or more TCP segments ("segments") at step 508. In preferred embodiments, a first of the segments includes the header while the subsequent segments include message data only.

Upon receipt of the segments, the TCP device reads the length value from the header of the first segment received, and then accumulates the message data from each segment until an amount equal in size to "length" is received. At this point, the entire message is received and thus, may be processed by the TCP device.

Figure 5B:
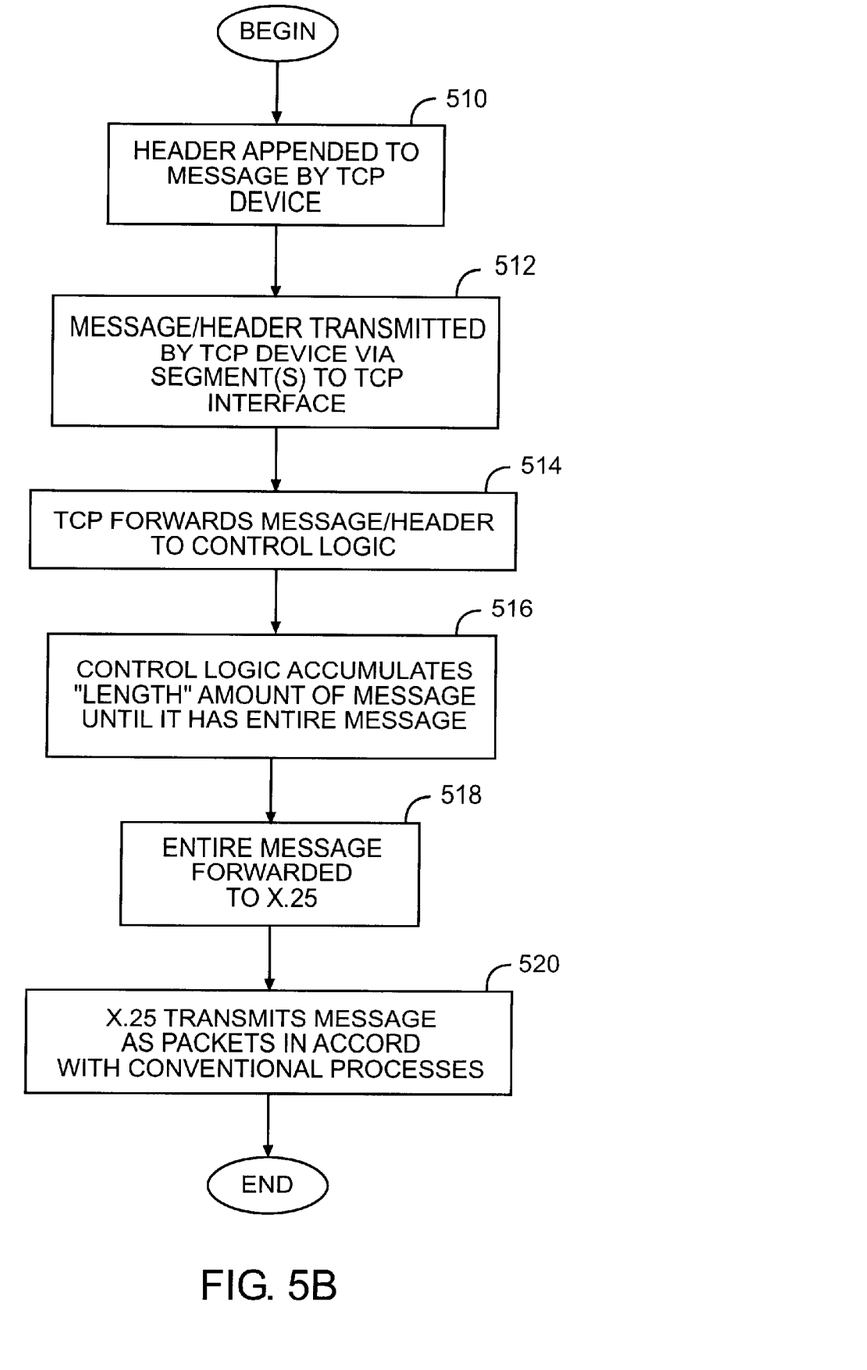

FIG. 5B similarly shows the preferred process of FIG. 5A in the reverse direction (i.e., when a message is transmitted from the TCP device to the X.25 device). The process begins at step 510 in which a header having a length field is appended to the message by the TCP device. The length of the message accordingly is calculated by the TCP device. The message/header combination then is transmitted by the TCP device to the TCP interface 206 via one or more segments (step 512). The TCP interface 206 responsively extracts the message/header data from the received segments and forwards them to the control logic 204 (step 514). In preferred embodiments, this may be performed by storing the message/header data retrieved from the segments in a first-in, first-out buffer (not shown) that is accessible by the control logic 204.

The process continues to step 516 in which the control logic 204 accumulates the amount of message data as specified by the length field. More particularly, in preferred embodiments, the control logic 204 reads the length data from the front of the buffer and retrieves the amount specified by the length data of additional message data in the buffer. The entire accumulated message then is forwarded to the X.25 interface 202 at step 518. The process concludes by the message being transmitted by the X.25 interface 202 to the X.25 device via one or more packets in accord with conventional processes.

Figure 6A:
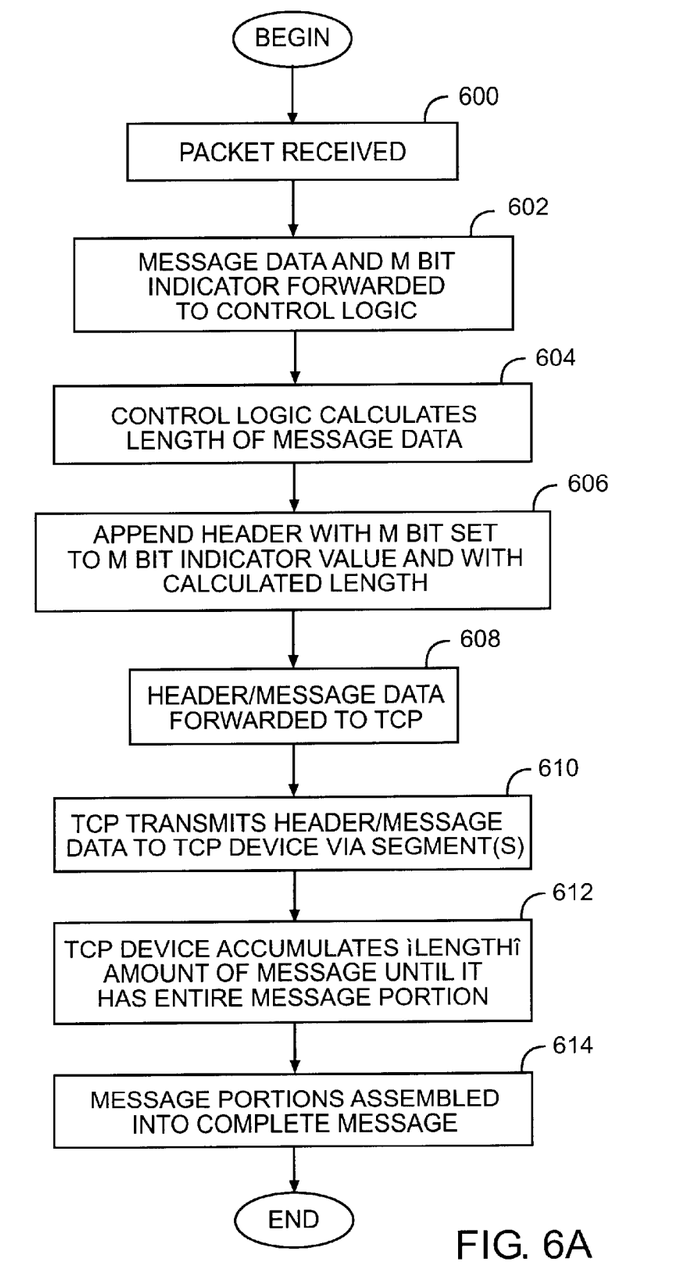
FIGS. 6A and 6B show another preferred process for transmitting messages between a TCP device and an X.25 device.

FIG. 6A shows another preferred embodiment of the invention in which additional header data is utilized to further facilitate message transmission from the X.25 device to the TCP device. Unlike the embodiments shown in FIGS. 5A and 5B, portions of the message data may be transmitted through the translator without requiring it (the translator) to accumulate the entire message. Accordingly, the process begins at step 600 in which a packet is received by the X.25 interface 202 from the X.25 device. The packet may include message data representing either the entire message, or a portion of the message. The message data (also referred to in this embodiment as a "message portion") and an "M bit indicator" then are forwarded to the control logic 204 (step 602). The M bit indicator indicates whether the M bit is set in the received packet. Accordingly, the M bit indicator is set to be high when the M bit in the packet is set to be high, and it is set to be low when the M bit in the packet is set to be low.

The process then continues to step 604 in which the control logic 204 calculates the length of the message data. A header then is appended to the message data at step 606. Among the fields in the header is a length field and a more field ("M" field). The length field is set to be equal to the calculated length of the message data (i.e., the message portion), while the M field is set to be equal to the value of the M bit indicator.

After the header is appended to the message data, the process continues to step 608 in which the header/message data is forwarded to the TCP interface 206 for transmission to the TCP device. The TCP interface 206 responsively transmits the header/message data to the TCP device via one or more segments (step 610). The TCP device consequently receives the segments and accumulates an amount of message data (step 612) equal to the "length" field in the header (in the first segment), thus assembling the message data received by each segment into a complete message portion for processing. The complete message portion then is added to any previously formed message portion (if any). If the M field was set upon receipt of the current message portion, then the entire message is not completely assembled. In such case, one or more additional message portions must be received to complete the entire message. If the M field was not set, however, then the entire message is formed, thus completing the process.

Figure 6B:
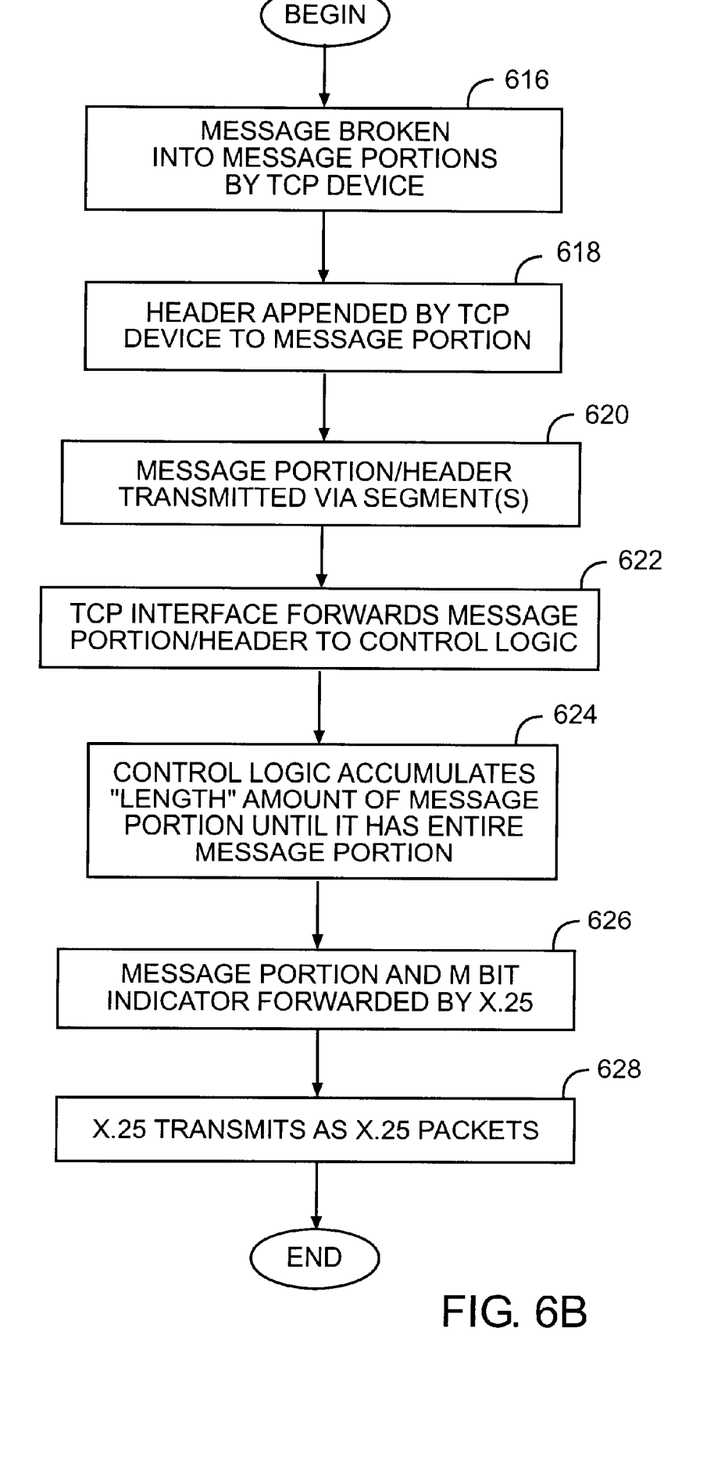

FIG. 6B similarly shows the preferred process of FIG. 6A in the reverse direction (i.e., when a message is transmitted from the TCP device to the X.25 device). To that end, the process begins at step 616 in which an entire message is broken into message portions by the TCP device. This embodiment is applicable, however, to those instances when the message is not broken into message portions.

A header having a length field and an M field then is appended to each message portion by the TCP device (step 618). The M field is set if additional message portions are to follow the respective message portions. Each message portion/header then is transmitted by the TCP device to the TCP interface 206 via one or more segments (step 620). In a manner similar to step 514, the TCP interface 206 responsively extracts the message/header data from the received segments for a given message portion, and then forwards them to the control logic 204 (step 622). In preferred embodiments, this may be performed by storing the message/header data retrieved from the segments in a first-in, first-out buffer (not shown) that is accessed by the control logic 204.

The process continues to step 624 in which the control logic 204 accumulates the amount of message data as specified by the length field (i.e., the entire message portion) of the given message portion. More particularly, in preferred embodiments, the control logic 204 reads the length data from the front of the buffer and retrieves the amount specified by the length data of additional message data in the buffer for that message portion. In addition, the M bit indicator is set by the control logic 204 to be equal to the value of the M bit in the header. After the message portion is accumulated for the given message portion, it is forwarded to the X.25 interface 202, along with the M bit indicator (step 626). The X.25 interface 202 responsively transmits the message portion to the X.25 device via one or more packets. The M bit in each of the transmitted packets is set to be high (indicating more packets are to be received for this message) in the event that its M bit indicator is set as such (step 628). The X.25 device responsively forms the message from the message portions, thus completing the process.

In alternative embodiments, the header may be a footer, or datum fields dispersed at other locations within the message data. In such case, the control logic 204 is preconfigured to locate the such datum fields at the appropriate locations. In addition, the such datum may include other data fields. For example, the data fields may include a "type" field, a "version" field, or other field that may be utilized to facilitate data transmission.

It should be noted that although specific transport protocols are discussed, such protocols are discussed by example only and should not be construed to limit the scope of the invention. Accordingly, principles of preferred embodiments of the invention may be applied to other similar and dissimilar protocols. For example, principles of preferred embodiments may be applied to end devices utilizing identical or dissimilar transport protocols. In addition, principles of the invention may be applied to translators that translate between packet based protocols and stream based protocols. In addition to X.25, other exemplary packet based protocols include Asynchronous Transfer Mode ("ATM") and Systems Network Architecture ("SNA"). Other exemplary stream based protocols include voice and video protocols.

Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as preprogrammed hardware elements, or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

I claim:

1. A method of translating a message from a first transmission protocol to a transmission control protocol (TCP), the message having message data, the method comprising:

receiving the message from a first network using the first protocol;

calculating the length of the received message data;

appending a length datum to the message data to produce a revised message, the length datum indicating the calculated length of the message data;

translating the revised message from the first protocol to the TCP to make a translated message;

creating, as part of the translating, a header selected from the group consisting of: a null header, a short header, and a long header, such that if the null header is used the translated message consists of just a client message, if the short header is used, the translated message consists of a message length and a client message, and if the long header is used, the translated message comprises a M flag, a message length, and a client message; and directing the translated message to a second network using the second protocol for mission in the second protocol.

2. The method as defined by claim 1 wherein the first protocol is a packet based protocol.

3. The method as defined by claim 2 wherein the first protocol is X.25.

4. A method of translating a message from a first transmission protocol to a second transmission protocol, the method comprising:

receiving the message in a first protocol from a first network;

translating the message from the first protocol to the second protocol;

forming the message data;

creating, as part of the translating, a header selected from the group consisting of: a null header, a short header, and a long header, such that if the null header is used the translated message consists of just a client message, if the short header is used, the translated message consists of a message length and a client message, and if the long header is used, the translated message comprises a M flag, a message length, and a client message; and directing the formed message data to a second network utilizing the second protocol for transmission in the second protocol.

5. The method as defined by claim 4 wherein a more datum is appended directly to the message data, the more datum indicating the additional message data is to be received in the first protocol to complete the message, the message further comprising:

setting a more field in the second protocol if the more datum is set to indicate that additional message data is to be received in the first protocol to complete the message.

6. A computer program product for use on a computer system for translating a message from a first transmission protocol to a second transmission protocol, the message having message data and an appended length datum indicating the length of the message data, the length datum being appended directly to the message data, the computer program product comprising a computer usable medium having computer readable program code thereon, the computer readable program code including:

program code for receiving the message in the first protocol from a first network;

program code to form the message data;

program code for translating the message from the first protocol to the second protocol;

program code for creating, as part of the translating a header selected from the group consisting of: a null header, a short header, and a long header, such that if the null header is used the translated message consists of just a client message, if the short header is used, the translated message consists of a message length and a client message, and if the long header is used, the translated message comprises a M flag, a protocol version, a message type, a message length, and a client message; and program code for directing the formed message to a second network utilizing the second protocol for transmission in the second protocol.

* * * * *